US012762966B2

(12) United States Patent
Schwiesow

(10) Patent No.: US 12,762,966 B2
(45) Date of Patent: Oct. 13, 2026

(54) SENSING SYSTEM WITH MULTI-SENSOR FUSION

(71) Applicant: The Boeing Company, Arlington, VA (US)

(72) Inventor: Michael Brandon Schwiesow, Toney, AL (US)

(73) Assignee: THE BOEING COMPANY, Arlington, VA (US)

( * ) Notice: Subject to any disclaimer, the term of this patent is extended or adjusted under 35 U.S.C. 154(b) by 27 days.

(21) Appl. No.: 18/797,194

(22) Filed: Aug. 7, 2024

(65) Prior Publication Data

US 2026/0045168 A1 Feb. 12, 2026

(51) Int. Cl.
*G08G 5/51* (2025.01)
*G06V 10/80* (2022.01)
*G06V 20/56* (2022.01)
*G08G 5/21* (2025.01)

(52) U.S. Cl.
CPC ............... *G08G 5/51* (2025.01); *G06V 10/80* (2022.01); *G06V 20/56* (2022.01); *G08G 5/21* (2025.01)

(58) Field of Classification Search
CPC .. G08G 5/51; G08G 5/21; G08G 5/26; G08G 5/80; G06V 10/80; G06V 20/56; G01S 7/4808; G01S 17/86; G01S 17/933; G01S 17/42; G01S 17/87; G01S 17/89
See application file for complete search history.

(56) References Cited

U.S. PATENT DOCUMENTS

| | | | | |
|---|---|---|---|---|
| 6,305,484 | B1 | 10/2001 | Leblanc | |
| 8,022,978 | B2 | 9/2011 | Konya | |
| 8,264,377 | B2 | 9/2012 | Griffith | |
| 8,694,238 | B2 | 4/2014 | Venkatasubramanian | |
| 9,394,059 | B2 | 7/2016 | Cox et al. | |
| 9,773,421 | B2 | 9/2017 | Wang et al. | |
| 9,805,605 | B2 | 10/2017 | Ramanujam | |
| 10,592,749 | B2 | 3/2020 | Coppock et al. | |
| 11,801,870 | B2 | 10/2023 | Salehi et al. | |
| 2004/0056952 | A1 | 3/2004 | Konya | |
| 2011/0015816 | A1 | 1/2011 | Dow et al. | |
| 2016/0005319 | A1 * | 1/2016 | Cros .................... | G02B 27/017 701/3 |

(Continued)

FOREIGN PATENT DOCUMENTS

| | | |
|---|---|---|
| CN | 112507774 A | 3/2021 |
| WO | 2022170401 A1 | 8/2022 |

OTHER PUBLICATIONS

Auction Algorithms for Network Flow Problems a Tutorial Introduction; Dimitri P. Bertsekas (Year: 1992).*

(Continued)

*Primary Examiner* — Kito R Robinson
*Assistant Examiner* — Alexander V Gentile
(74) *Attorney, Agent, or Firm* — MH2 Technology Law Group LLP

(57) ABSTRACT

An object classification system for a vehicle detects, with a computing device, a first field of view with a first sensor and a second field of view with a second sensor, each sensor mounted on the vehicle. The computing device may fuse the first field of view with the second field of view to form a unified detection report, which may be used to automate portions of a taxiing operation in response to information in the unified detection report.

20 Claims, 7 Drawing Sheets

(56) References Cited

U.S. PATENT DOCUMENTS

| | | | | |
|---|---|---|---|---|
| 2017/0358102 | A1 | 12/2017 | Akiyama | |
| 2019/0027051 | A1 | 1/2019 | Veronesi et al. | |
| 2019/0086923 | A1 | 3/2019 | Zhang et al. | |
| 2019/0146083 | A1 | 5/2019 | Pesik et al. | |
| 2019/0147756 | A1 | 5/2019 | Gadgil et al. | |
| 2020/0025902 | A1 | 1/2020 | Vishwajeet et al. | |
| 2020/0118450 | A1* | 4/2020 | Gariel | G08G 5/54 |
| 2020/0389625 | A1 | 12/2020 | Mukhopadhyay et al. | |
| 2021/0080952 | A1 | 3/2021 | Owechko | |
| 2021/0181764 | A1* | 6/2021 | Conway | G08G 5/21 |
| 2021/0350715 | A1 | 11/2021 | Liu et al. | |
| 2022/0189316 | A1 | 6/2022 | Paul et al. | |
| 2022/0250654 | A1* | 8/2022 | Zhang | G08G 1/20 |
| 2022/0300001 | A1 | 9/2022 | Shreekant et al. | |
| 2023/0057118 | A1 | 2/2023 | Bankiti et al. | |
| 2023/0076554 | A1* | 3/2023 | Shyman | G08G 5/22 |
| 2023/0230255 | A1 | 7/2023 | Jia | |
| 2023/0243970 | A1 | 8/2023 | Lee et al. | |
| 2023/0314599 | A1 | 10/2023 | Jia et al. | |
| 2024/0021095 | A1 | 1/2024 | Harrison | |
| 2024/0101149 | A1 | 3/2024 | Lee et al. | |
| 2024/0144836 | A1 | 5/2024 | Chik | |
| 2024/0203273 | A1 | 6/2024 | Mere et al. | |
| 2024/0264276 | A1 | 8/2024 | Long et al. | |
| 2025/0111794 | A1* | 4/2025 | Franzini | G08G 5/26 |
| 2025/0131836 | A1* | 4/2025 | Gu | G08G 5/51 |

OTHER PUBLICATIONS

Bidding Protocols for Deploying Mobile Sensors; Guiling (Grace) Wang, Guohong Cao, Piotr Berman, and Thomas F. La Porta, Felloe, IEEE (Year: 2007).*

Joy Au, Challenges and Opportunities of Computer Vision Application in Aircraft Landing Gear, 2022 IEE Aerospace Conference, Mar. 5, 2022, 10 pages (Year: 2022).*

Auction Algorithims for Network Flow Problems a Tutorial Introduction; Dimitri P. Bertsekas (Year: 1992).*

Bidding Protocols for Deploying Mobile Sensors; Guiling (Grace) Wang, Guohong Cao, Piotr Berman, and Thomas F. La Porta, Fellow, IEEE (Year: 2007).*

Schwiesow, Michael Brandon, U.S. Appl. No. 18/797,187, filed Aug. 7, 2024, entitled "Object Classification System From Unstructured Point Clouds," 34 pages.

Extended European Search Report issued Dec. 19, 2025 in EP Application No. 25187227.1, 10 pages.

Au et al., "Challenges and Opportunities of Computer Vision Applications in Aircraft Landing Gear," 2022 IEEE Aerospace Conference, Mar. 5, 2022, 10 pages.

Extended European Search Report for European Application No. 25189032.3 dated Dec. 15, 2025, 13 pages.

* cited by examiner

900

414

| $B_{ij}$ | Camera 1 | Camera 2 | ε=0.1 |
|---|---|---|---|
| Lidar 1 | 0.1 | 0.6 | |
| Lidar 2 | 0.3 | | |
| Lidar 3 | 0.3 | 0.8 | |

940

| Round | At Auction | Cam 1 Bid | Cam 2 Bid | New Price | Assignment | Unassigned |
|---|---|---|---|---|---|---|
| 1 | L1 | 1.0 | 0.6 | 0.5 | L1 to C1 | L2, L3 |
| 2 | L2 | 0.3 | 0.0 | 0.4 | L2 to C1 | L2, L3 |
| 3 | L3 | 0.3 | 0.8 | 0.6 | L3 to C2 | L1 |
| 4 | L1 | 0.5 | 0.1 | 1.0 | L1 to C1 | L2 |
| 5 | L2 | -0.1 | -0.4 | 0.4 | L2 to None | |

910 920 930

610

1100

1200

SENSING SYSTEM WITH MULTI-SENSOR FUSION

TECHNICAL FIELD

The present disclosure is directed to a multi-sensor detection system for a vehicle with optimized object sensing.

BACKGROUND

With greater computing capabilities providing faster, and more complex, computations, larger volumes of activities are being partially, or completely automated. The use of sensors to detect various aspects of an environment has further enabled computing devices to evaluate and understand automation activities. As a result, the efficiency, accuracy, and safety of assorted tasks may be enhanced by incorporating automation computing devices.

While the utilization of a single sensor may provide sufficient information to automate relatively simple tasks, a single sensor may prove inefficient to automate relatively complex, or dangerous, activities. Hence, a variety of separate sensors may be employed to gather information that enables relatively complex activities to be safely automated. However, the use of multiple different sensors may pose operational challenges in the form of identifying errors, processing multiple different types of sensor information, and rendering a unitary view of an environment in which automation activities may be carried out.

With these operational challenges in mind, there is a continued goal to improve the efficiency, accuracy, and capabilities of automation systems that utilize multiple sensors to gather environmental and operational information. For instance, a goal may be improving the safety and seamless adaptations of a taxiing operation for an aircraft or vehicle.

SUMMARY

A sensing system, in some embodiments, has a vehicle with a computing device connected to a first sensor and a second sensor each mounted on vehicle. The computing device may fuse data from the first sensor and the second sensor into a unified detection report that allows the computing device automates portions of a taxiing operation in response to information in the unified detection report.

In accordance with various aspects of the disclosure, an object classification system for a vehicle detects, with a computing device, a first field of view with a first sensor and a second field of view with a second sensor, each sensor mounted on the vehicle. The computing device may fuse the first field of view with the second field of view to form a unified detection report, which may be used to automate portions of a taxiing operation in response to information in the unified detection report.

Other embodiments of a sensing system detect, with a computing device, a first field of view with a first sensor and a second field of view with a second sensor, each sensor mounted on an aircraft that flies. The computing device then fuses the first field of view with the second field of view to form a unified detection report that allows the computing device to generate an automated activity. The computing device subsequently determines a destination for the automation task and automates portions of a taxiing operation by executing the automation task via the destination.

BRIEF DESCRIPTION OF THE DRAWINGS

Further advantages and features of the present disclosure will become apparent from the following description and the accompanying drawings, to which reference is made.

DETAILED DESCRIPTION

Embodiments of the disclosure are generally directed to a sensing system employing multiple sensors with improved sensor information fusion to automate operational aspects of a vehicle, such as taxiing operations for an aircraft that is capable of flight while the aircraft is on the ground or driving operations for an automobile that is not capable of flight.

Reference will now be made in detail to presently preferred embodiments and methods of the present disclosure, which constitute the best modes of practicing the present disclosure presently known to the inventors. However, it is to be understood that the disclosed embodiments are merely exemplary of the present disclosure that may be embodied in various and alternative forms. Therefore, specific details disclosed herein are not to be interpreted as limiting, but merely as a representative basis for any aspect of the present disclosure and/or as a representative basis for teaching one skilled in the art to variously employ the present disclosure.

It is also to be understood that this present disclosure is not limited to the specific embodiments and methods described below, as specific components and/or conditions may, of course, vary. Furthermore, the terminology used herein is used only for the purpose of describing particular embodiments of the present disclosure and is not intended to be limiting in any way.

The proliferation of sensing technology and computing capabilities has allowed increasing numbers of manual activities to be partially, or completely, automated. As a result, the safety, accuracy, and efficiency of tasks has increased. However, the automation of relatively complex activities, which may involve inherent danger, may remain a challenge despite the evolution of computing and sensing technologies. As such, various embodiments are directed to the intelligent utilization of multiple sensors to provide a more robust, and efficient, understanding of the environment and events in which automation may be conducted.

Figure 1:
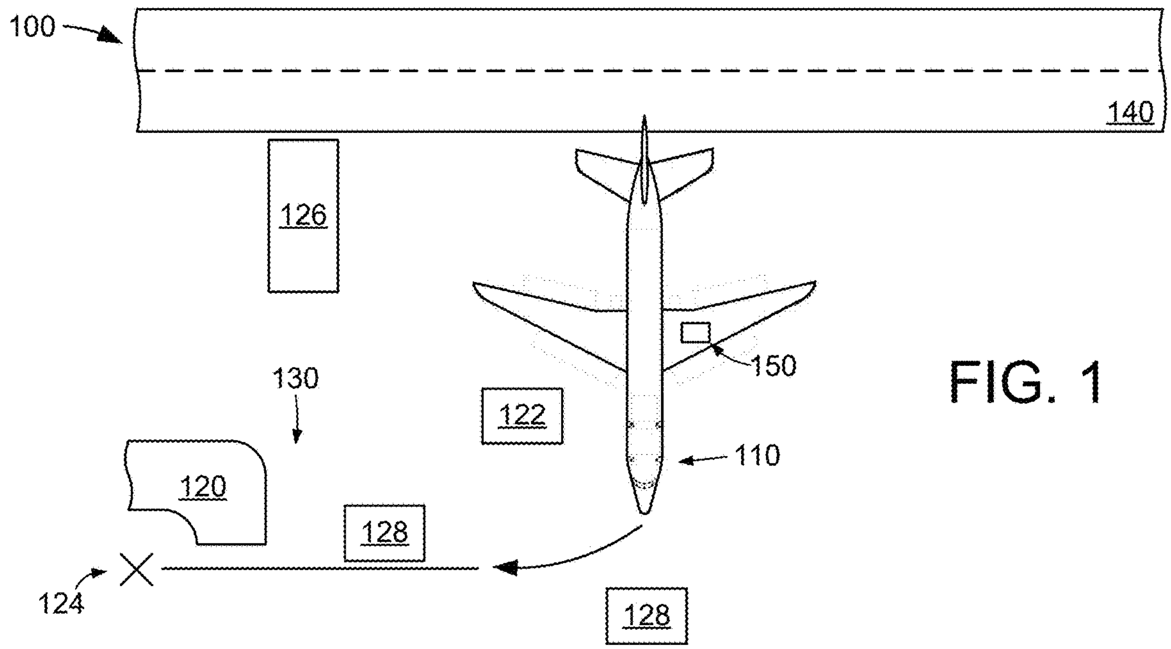
FIG. 1 illustrates portions of a taxiing environment in which assorted embodiments can be practiced.

In FIG. 1, portions of a sensing environment 100 are illustrated in which assorted embodiments of the present disclosure may be practiced. The top view of the sensing environment 100 conveys how an aircraft 110, such as an airplane, glider, lifting body, or other machine capable of flight, may be positioned during a taxiing operation with a gate 120. It is noted that the aircraft 110 is not limited to a particular type, size, or flying capability and, as such, may be a vertical takeoff and landing (VTOL) airplane, autonomous drone, semi-autonomous airplane, or other flying machine.

While not required, the gate 120 may be a portion of a site 130, such as an airport, hanger, or other facility, that functionally services aspects of the aircraft 110. It is noted that the gate 120 may be one or many similar, or dissimilar, gates 120 operating concurrently, or sequentially, to transfer cargo, such as humans, animals, or containers, between the site 130 and the aircraft 110. It is further noted that the gate 120 may be any structural configuration that accesses one or more ports of the aircraft 110, such as a door, hatch, or window.

The operation of the gate 120 to provide ingress to, or egress from, the aircraft 110 may be relatively straightforward and often is carried out safely and efficiently. However, moving and positioning the aircraft 110 relative to the gate 120 during a taxiing operation may be more complicated while presenting hazards and obstacles the jeopardize the safety of the aircraft 110 itself and the contents of the aircraft 110.

In an effort to align portions of the aircraft 110 with the gate 120, one or more static indicators 122 may be positioned along a route from a runway 140 to the gate 120. The term "runway" is used herein to include a defined area for the landing and takeoff of the aircraft 110, taxiways for general movement of assorted objects and aircraft 110, and general areas that facilitate blast pads and overruns. The surface of the runway 140 may be a natural material, such as dirt, water, or ice, as well as combinations of materials, such as concrete or asphalt. A runway 140, in some embodiments, includes a water surface, a strip for training the aircraft 110, which may be adjacent to another runway 140, a vertiport, or a heliport.

An aircraft 110 may include flying vehicles, such as, for example, but not limited to, commercial aircraft, private aircraft, military aircraft, watercraft, and helicopters among other types of flying, or hovering, vehicles. Runways 140, for example, may be any dimensions, such as 800 feet long by 26 feet wide or 40,000 feet long by 900 feet wide. A runway 140 may be virtual in some embodiments. Such a virtual runway 140 may, or may not, have visual markings. Other runways 140 may be non-precision instrument runways that include visual markings, such as centerlines for horizontal guidance, aiming points for vertical position guidance, and buoys. For precision instrument runways 140, blast pad, overrun areas, beginning space markers, ending space markers, centerlines, aiming points buoys, and other approach guidance fiducials may be included. There are, for example, single runways, parallel runways, intersecting runways, and open-V runway configurations, none of which are required or limiting to practice the assorted sensing embodiments of the present disclosure.

A static indicator 122 may be any diagram, symbol, or text located on a permanent, or temporary, surface. For instance, a parking region 124 of a paved ground surface may be occupied by lines and symbols associated with desired parking position of an aircraft 110 while text may be present on a selectable sign 126. Static indicators 122 may operate in concert with dynamic indicators 128, such as humans, motorized equipment, and flashing lights, to identify conditions, status, and instructions to a vehicle 110, such as an aircraft, during a taxiing operation between the gate 120 and the runway 140.

Despite the presence of static 122 and/or dynamic 128 indicators, taxiing operations may be time consuming and wrought with dangerous situations that occur quickly and change frequently. Interpretation of the assorted indicators 122/128 may be conducted by human operators, which employ the indicator information to execute a variety of different tasks and adjustments for taxiing operations. Human evaluation and activity may provide safe taxiing operations in some situations based on numerous different environmental and situational considerations. Yet, human operators may be susceptible to errors, lapse in judgement, and inabilities to ascertain some situations accurately.

Accordingly, one or more sensors 150 may be employed to aid human operators in accurately identifying indicators 122/128, obstacles, and environmental conditions during taxiing operations. Sensors 150 may further be utilized to automate aspects of a taxiing operation. It is noted that any number of sensors may be positioned anywhere to gather information about aircraft 110, gates 120, indicators 122/128, and other conditions.

Regardless of the position of a sensor 150, gathered information may use one or more sensing technologies to locate, identify, and/or track objects, text, and symbols. For instance, a sensor 150 may employ light, radio, or ultrasonic frequencies to gather information about aspects of the sensor's field of view. Through the use of at least one sensor 150, safety and efficiency of various aspects of a taxiing operation may be enhanced. Specifically, the identification and tracking of objects with sensors 150 may enhance automated, or manual, avoidance.

Within the scope of the assorted embodiments of a sensing system that may be utilized in the sensing environment 100 of FIG. 1, or another environment, is a vehicle not capable of flight. For instance, the sensing environment 100 in which embodiments of a sensing system is practiced may be a road, bridge, highway, tunnel, or off-road trail traversed by a piloted, or autonomous, vehicle, such as a car, truck, van, or robot, without the ability to generate lifting forces greater than the weight of the vehicle itself. Accordingly, throughout the present disclosure the term "taxiing" operations may be synonymous with ground activity of a vehicle that does, or does not, have the ability to generate lift and fly on sites 130 that do, or do not, have gates 120, runways 140, or parking regions 124.

Figure 2:
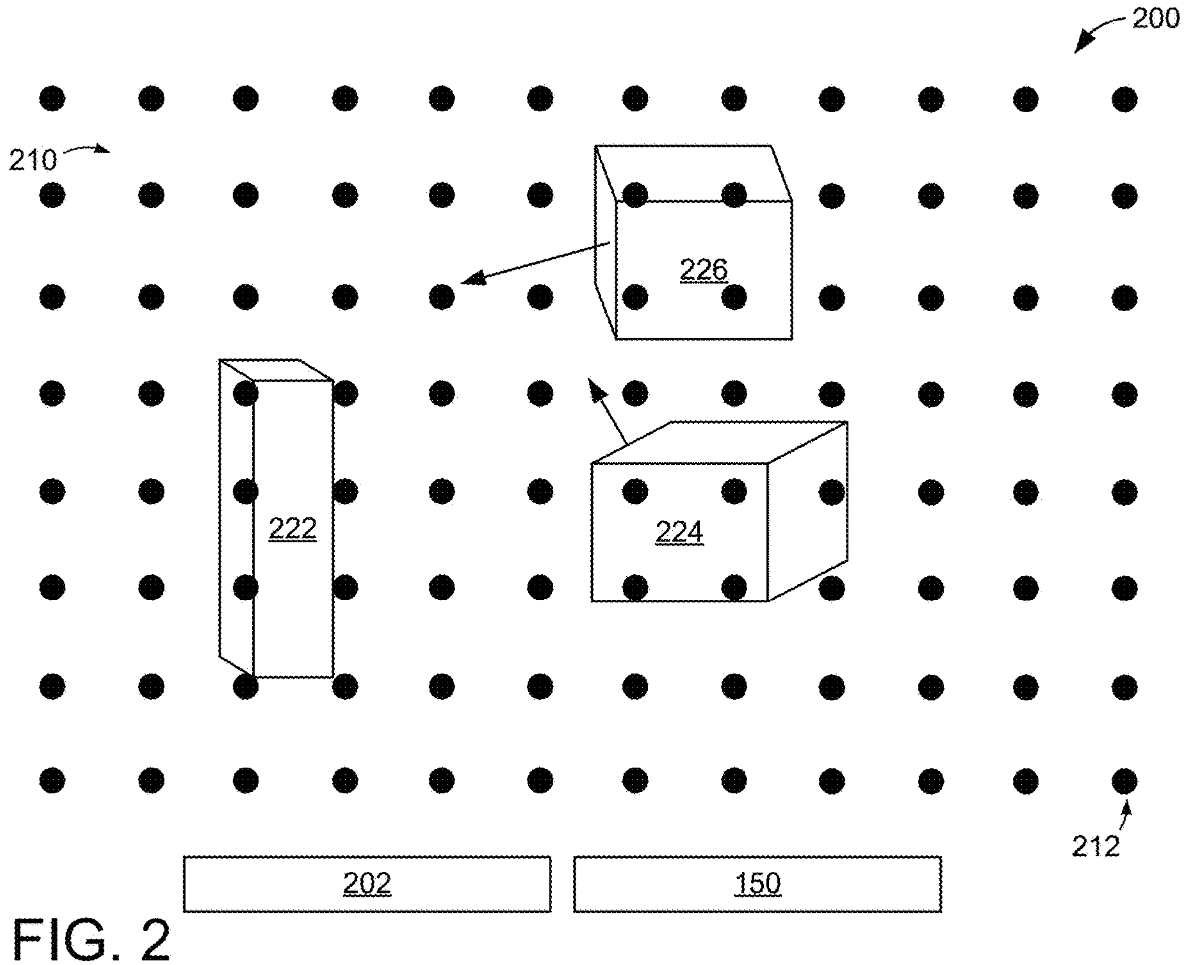
FIG. 2 illustrates aspects of the taxiing environment of FIG. 1 operated in accordance with various embodiments of this disclosure.

FIG. 2 illustrates portions of the sensing environment 100 when aspects of a sensing system 200 is employed in accordance with various embodiments. To clarify, the perspective view of FIG. 2 conveys a field of view of a sensor 150 as well as some of the information gathered by the sensor 150 and returned to a computing device 202 for processing and evaluation, which may be employed to automate aspects of a taxiing operation and/or indicate taxiing conditions to one or more human operators.

As shown, the sensor 150 creates an unstructured point cloud 210 that consists of a number of frequency points 212 respectively representing where frequency beams are emitted. Although not required or limiting, the frequency points 212 may be beams of visible, or non-visible light, sent from an emitter portion of the sensor 150, such as a mechanical optics or solid-state phase array, and collected by a detector portion of the sensor 150. For detection configurations utilizing such light frequencies, the sensor 150 may be characterized as a light detection and ranging (LiDAR) sensor.

While the operation of a LiDAR sensor 150 may provide object detection and tracking in some, theoretical situations, the practical operation of LiDAR sensing technology may present challenges. For instance, objects that have low reflectivity may present challenges to the efficient and reliable tracking and characterization of the object as static, such as object 222, or dynamic, such as objects 224 and 226. Various weather conditions, such as fog, snow, and rain, may result in consistent, or false identification of an object's state and, consequently, the accurate tracking of dynamic objects 224/226.

Even under ideal object detection conditions, a LIDAR sensor 150 may experience degraded reliability and/or performance. For instance, the presence of multiple objects 224/226 in a common space of the sensor's 150 field of view may cause detection, characterization, and tracking issues. That is, detecting whether one, or multiple, objects are present may cause the sensor 150 to temporarily, or permanently, mistake the state, direction of movement, and/or speed of movement of one or more objects. The non-limiting example shown in FIG. 2 illustrates how objects 224/226 moving at different directions and speed, as indicated by the orientation and length of solid arrows, may be mischaracterized as a single, stationary object by the sensor 150 in some situations.

Although not required or limiting, a computing device 202 may operate over time to identify and track various aspects in a field of view by segmenting a ground surface, identifying objects, defining one or more bounding boxes, defining object states as dynamic or static, tracking dynamic objects over time, and planning for expected path and velocity of dynamic objects. Such processes may be relatively straightforward in some situations, but are complicated by movement of the sensors, environmental conditions, and inconsistent readings from assorted sensors. Hence, embodiments are generally directed to enhanced manners of utilizing multiple sensors to efficiently and reliably detect and track assorted aspects over time.

With the operational challenges associated with object detection and state characterization due to inaccurate and/or inefficient operation of one or more sensors, the safety and confidence of automating aspects of aircraft 110 operation may be jeopardized. As a result, the generation of automation instructions, tasks, and actions, such as during taxiing activities, may be susceptible to operational challenges. Thus, various embodiments are directed to an object detection and tracking system for an aircraft 110 that provides enhanced object characterization and tracking that optimizes the automation of activities.

Figure 3:
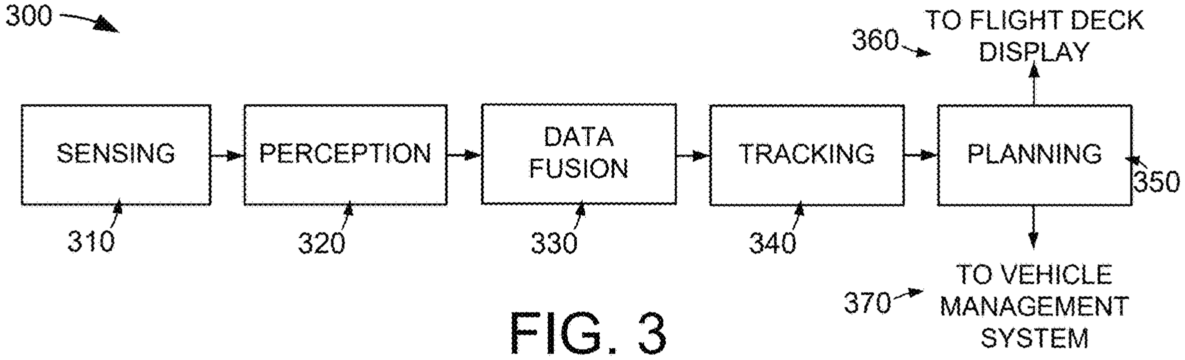
FIG. 3 illustrates a flowchart of a process that may be carried out in the taxiing environment of FIG. 1 in accordance with assorted embodiments of this disclosure.

FIG. 3 displays a flowchart of a sensing process 300 that may be carried out with assorted aspects of a sensing system in the sensing environment 100 of FIG. 1. It is noted that the sensing process 300 may be executed by one or computing devices 202 that operate at least one sensor 150, such as a LIDAR, RADAR, acoustic, thermal, optical, or ultrasonic sensor, to collect information during movement of an aircraft 110 between a runway 140 and a designated parking region, such as a gate, hanger, or other stable location or during movement of a vehicle on a road, trail, or path.

Initially, the sensing process 300 may activate one or more sensors 150 in step 310 to collect information about at least conditions and objects around an aircraft. A computing device next processes the gathered information from the connected sensors in step 320 to determine what is present within each sensor's field of view. That is, the computing device may separately characterize what different sensors detect in step 320 before combining the information from multiple sensors in step 330. The combination of information from different sensors in step 330 may be characterized as data fusion that provides efficient verification, redundancy, and error detection as the data from different sensors is compared by a computing device.

The combination of sensor data in step 330 may further allow for efficient state characterization of objects, which translates into efficient tracking of objects over time in step 340. The detection, characterization, and tracking of objects allows a computing device to generate and maintain one or more aircraft routes in step 350. In some embodiments, the route planning of step 350 may be supplemented by other information not generated by sensors, such as global policies, airport movement maps, and instructed aircraft movements.

The proactive planning of routes in step 350 allows for a variety of automated or manual responses. For instance, proposed aircraft routes and information about conditions and objects may be passed directly to a non-computing operator in step 360 to allow for manual execution of taxiing tasks and/or activities. Information and proposed routes may, alternatively, be sent to a completely autonomous taxiing system in step 370 where routes generated in step 350 are carried out via physical aircraft actions executed automatically by computing devices without direct control by manual operators.

Although the resulting information and routes from process 300 may be employed for purely manual or automated taxiing operations, other embodiments conduct taxiing operations with a combination of manual aspects and automated aspects. For instance, the planning of step 350 may prescribe automation of some aspects of a taxiing operation, such as aircraft speed or application of brakes, while other aspects, such as aircraft movement direction, remains in the supervision and control of one or more manual operators. As another example, direct control of an aircraft may remain with a manual operator while taxiing instructions, as interpreted by a computing device via the assorted aircraft sensors, provide guidance as to one or more aspects of a taxiing operation.

Through the utilization of various sensors as part of a sensing system in accordance with the sensing process 300, accurate operation of various redundant, or dissimilar, sensors may produce efficient and safe aircraft activities, particularly for taxiing operations. Various embodiments contemplate a more sophisticated version of the sensing process 300 of FIG. 3 in an effort to provide faster and more precise identification of objects, obstacles, and indicators to allow for greater route planning resolution and more seamless automated execution of prescribed aircraft actions to traverse between a runway and aircraft landing site.

As a non-limiting example, the sensing process 300 may further include steps that provide greater resolution for the aspects of an aircraft's field of view. Such steps may begin before, during, or after the data streams of multiple sensors are fused together through digital analysis and processing. With the results of sensor stream fusion, any number, type, and position of objects and surfaces in a field of view of an aircraft's sensors may be accurately detected. For instance, computer processing may be employed to detect a ground surface, static objects, dynamic objects, indicators, and humans from the fused data streams of assorted sensors. As a result of the detection of portions of an environment, an association of detected aspects may be generated.

Through the association of detected aspects from assorted sensors, a computing device can identify moving portions and update tracking information, which allows for the verification, or alteration, of the state of an object, identifier, or human. The updating of tracking information may, in some embodiments, allow for efficient and reliable estimates of the state of one or more aspects. Such estimation of a static or dynamic state may allow for more precise classification of the path and/or speed of a dynamic aspect.

With the known, and estimated, state of various detected aspects of a field of view, sensor information may be parsed into aspects that are expected to remain stationary (static) and aspects that are expected to move (dynamic) while taxiing operations are conducted. The parsing of sensed aspects into static and dynamic portions may result in the assignment of regions of a field of view to a static planner or to a dynamic planner. The separation of portions of a field of view may allow a computing device to conduct concurrent, or otherwise efficient, processing of real-time sensor information along with existing taxiing instructions, policies, and routes.

Figure 4:
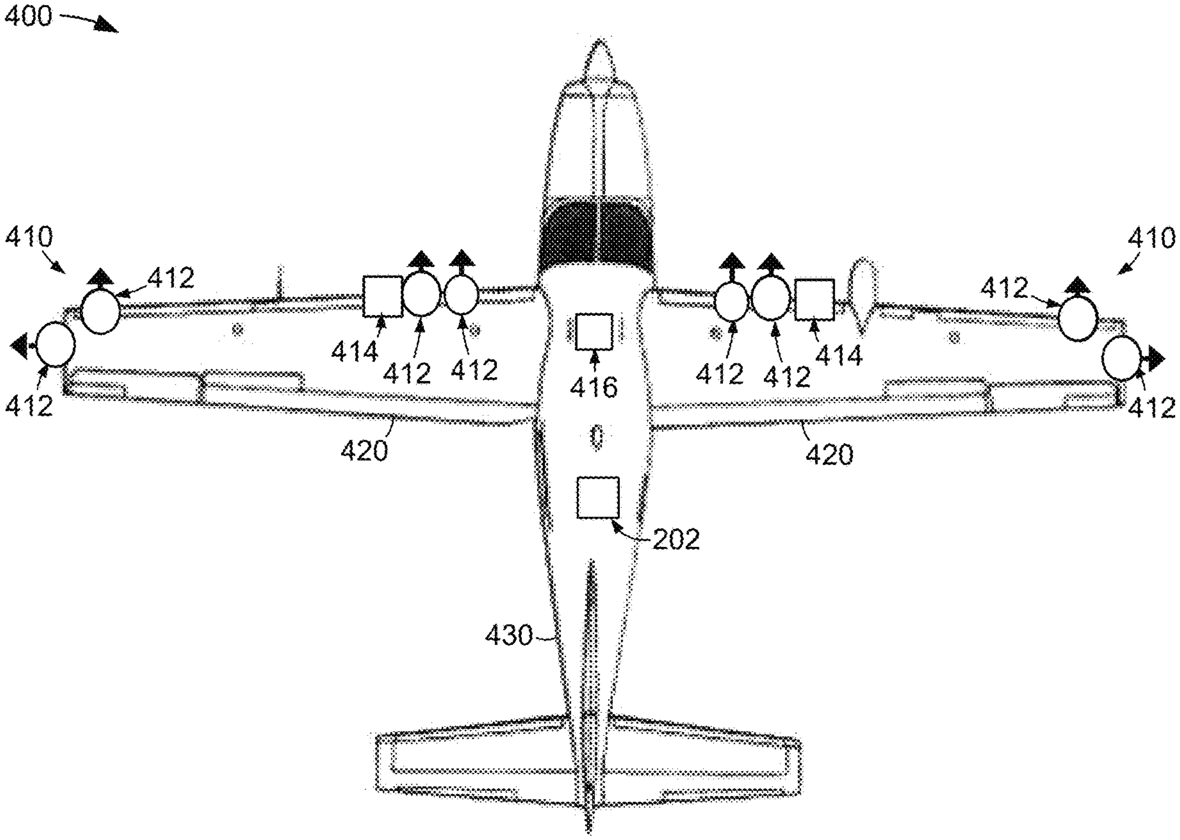
FIG. 4 illustrates an aircraft utilizing a sensing system in accordance with some embodiments of this disclosure.

FIG. 4 illustrates a top view line representation of portions of an aircraft 400 that may conduct taxiing operations with the sensing process 300 of FIG. 3 in the sensing environment 100 of FIG. 1. The top view of the aircraft 400 conveys how a computing device 202 may be present within an aircraft 110 and connected to an array 410 of sensors respectively positioned on separate positions along the wings 420 of the aircraft 110. It is noted that the positions of the sensors is not limited and various sensors may be located in a single position on the fuselage or wings.

In accordance with various embodiments, the sensor array 410 utilizes different types of sensors positioned at strategic locations along the respective wings 420. The number, type, and position of the sensors in the array 410 are not limited, but may be one or more optical, acoustic, thermal, or light detection and ranging (LiDAR) sensors. The sensor array 410 shown in FIG. 4 utilizes a number of differently configured optical sensors 412 in combination with a pair of LiDAR sensors 414 as well as a global positioning sensor 416.

By employing optical sensors 412 with different configurations, such as different lenses (6.5 mm, 12 mm, 35 mm), positioned at separate locations, in combination with the LiDAR sensors 414, the computing device 202 may provide a 360° perception about the fuselage 430 of the aircraft 400. That is, the collective data detected by the sensor array 410 may convey an effective field of view that completely surrounds the aircraft 110. Yet, it is noted that the assorted sensors of the array 410 may have individual fields of view that are fused by the computing device 202.

Through the intelligent operation of the sensor array 410 and processing of the sensor information, the frequency of detection errors from an unstructured point cloud of the LiDAR sensors 414 may be reduced. The ability to concurrently employ multiple sensors to understand the environment in which taxiing operations are occurring allows, in some embodiments for a more complete, accurate, precise, and/or efficient detection of assorted surfaces, objects, and obstacles to taxiing operations than utilizing a low number of sensors.

However, the accurate and efficient fusion of sensor data from the assorted sensors of the sensor array 410 may present operational challenge. Accordingly, various embodiments are directed to a multi-sensor system with optimized aggregation of different sensor information into a unitary image that may be efficiently and accurately evaluated by the computing device 202 to provide intelligent automation instructions, tasks, and execution, particularly during taxiing operations with an aircraft, or vehicle.

Figure 5:
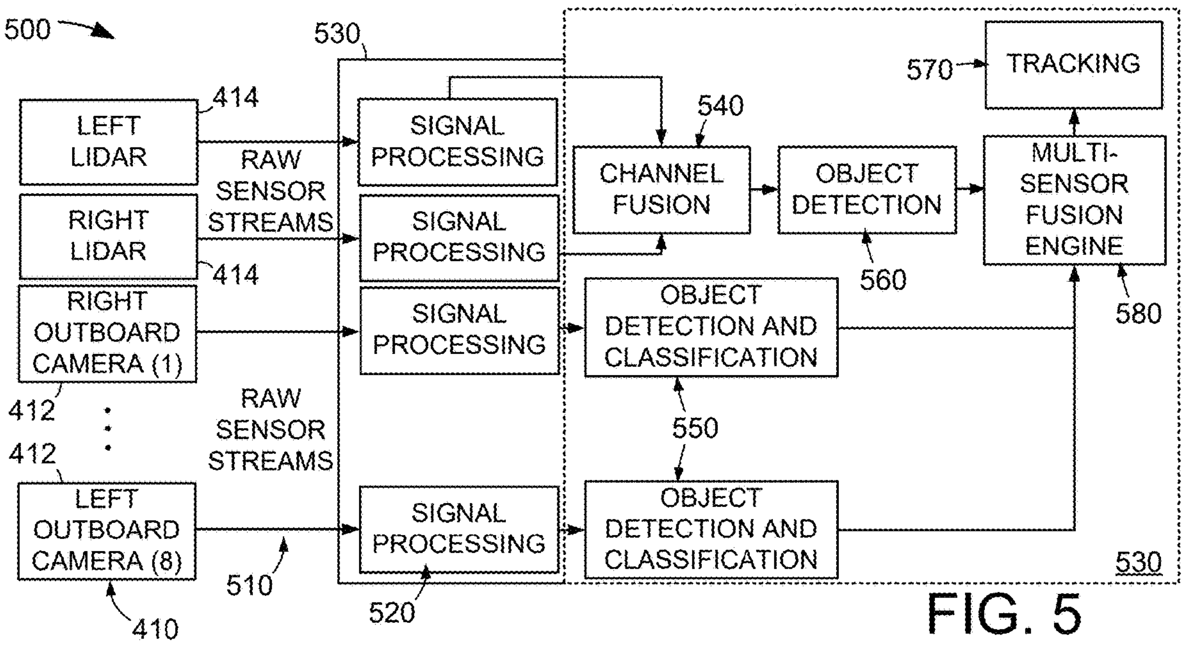
FIG. 5 illustrates a flowchart of a process that may be carried out in the taxiing environment of FIG. 1 in accordance with various embodiments of this disclosure.

FIG. 5 illustrates a block representation of a multi-sensor sensing system 500 that may be operated with a computing device 202 as part of the aircraft 400 of FIG. 4. In accordance with various embodiments, the system 500 may be arranged with a sensor array 410 that employs a variety of different sensors (412/414) at strategic positions along the wings 420 and/or fuselage 430 of an aircraft 400. When activated by the computing device 202, each sensor of the array 410 provides a separate raw stream of detection data, as illustrated by solid arrows 510.

While the assorted raw streams of sensor data may be individually processed in step 520 to convey aspects of an aircraft's field of view, various embodiments utilize a central computing device 530 to collect and process the sensor data into a format, size, and digital configuration that allows for subsequent identification one or more objects, surfaces, humans, or other obstacles. As illustrated by the solid and segmented boxes, a computing device 530 may operate to conduct a single assigned task, such as signal processing, or multiple different tasks, such as object detection, object classification, and fusing separate sensor streams.

For example, one or more computing devices 530 may conduct any number and type of separately or concurrently with different computing devices 530 or aspects of a single computing device 530. That is, separate cores, channels, and circuitry of a single computing device 530 may conduct different signal processing and/or evaluation, sequentially or concurrently, to translate the assorted sensor data streams into forms in which object detection, classification, and tracking. It is noted that signal processing in step 520 may involve any number, and type, of data translation. For instance, signal processing may provide noise reduction, size alteration, resolution compatibility, surface detection, and object detection.

Regardless of the number of computing devices 530 employed to conduct the various data processing and evaluation operations shown in FIG. 5, various embodiments conduct assigned tasks for specific sensor streams. That is, the post-processing streams from the LiDAR sensors 414 may be fused in step 540 while one or more data streams from optical sensors 412 are, individually or collectively, utilized to detect and/or classify objects, surfaces, and obstacles in the sensor's field of view in step 550. The use of different optical sensors 412, as shown in FIG. 4, for object detection and classification may provide diversity and/or redundancy that enhances the accuracy and precision of understanding a field of view.

While processed data streams from optical sensors 412 may be utilized individually to detect and/or classify objects, as shown, the separate data streams from the LiDAR sensors 414 may be fused in step 540 before detecting objects, surfaces, and obstacles in step 560. Such fusion of data streams from LiDAR sensors 414 may provide a different perspective, resolution, accuracy, and/or precision for object detection in step 560, compared to the object detection of step 550. That is, the use of optically sourced data detection in step 550 may differ from the object detection in step 560 from a single, fused image from separate LiDAR sensor 414 data streams.

It is noted that the fusion of LiDAR sensor 414 streams separate from object detection and classification of processed optical data streams is not required, but may provide preliminary results that can be employed to enable efficient, and accurate, tracking of dynamic objects in step 570. In other words, the concurrent, and separate, object detection in LiDAR data streams (step 560) and optical data streams (step 550) allows for efficient use of computing resources and identifies aspects of an aircraft's field of view that may be characterized as dynamic or static, which corresponds with more efficient and accurate tracking in step 570.

The ability to conduct assorted object detection and classification with differently sourced data streams may continue through object tracking in step 570. However, some embodiments merge the assorted sensor information, after respective object detection operations, into a single, unitary field of view with a fusion engine 580 prior to object tracking, as shown. Through the intelligent fusion of sensor data streams to form a comprehensive field of view for an aircraft 400, efficient and reliable automation of some, or all, of a taxiing operation may be conducted with less errors, delays, and faults than tracking objects based on a single sensor, or type of sensor.

Figure 6:
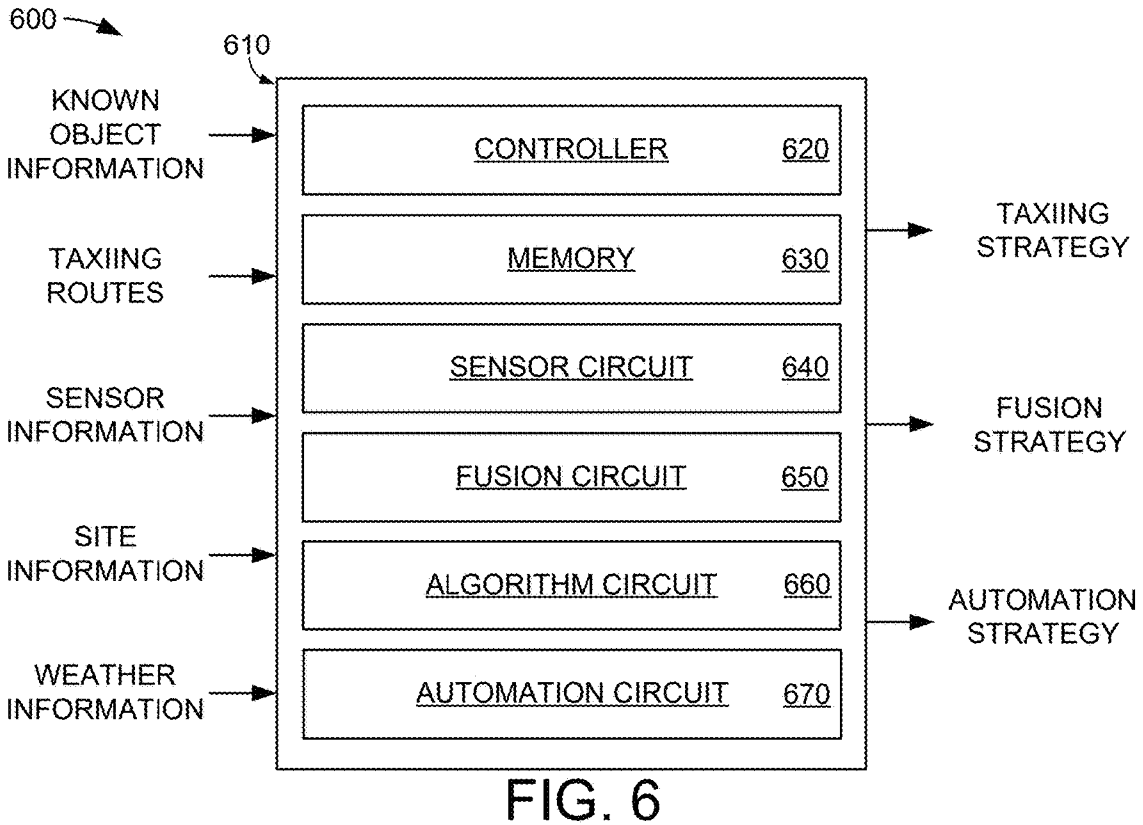
FIG. 6 illustrates a block representation of aspects of a sensing system that may be utilized in a taxiing environment in some embodiments.

FIG. 6 illustrates a block representation of a sensor fusion system 600 that may be employed in a taxiing environment 100 of FIG. 1 with the aircraft 400 of FIG. 4 in accordance with various embodiments or in a driving environment for a non-flying vehicle. The system 600 may be manifested in hardware and software in one or more computing devices 610 located on an aircraft 110, a taxiing site, or both. It is noted that the computing device 610 may correspond, with matching or dissimilar operating characteristics, with device 202 of FIG. 2 and/or device 530 of FIG. 5.

A computing device 610 may employ one or more controllers 620, such as a microprocessor, system on chip, integrated circuit, or other programmable circuitry, that processes various input information, such as sensor information, existing site information, predetermined taxiing routes, weather information, and known object characteristics, to output various object detection, object classification, and automation instructions. It is contemplated that the computing device 610 may store various software, information, and data in one or more memories 630, such as permanent non-volatile solid-state memory cells, permanent magnetic sectors, or volatile solid-state cells.

Although the controller 620 may conduct any amount of processing to output assorted strategies, algorithm terms, and object characterizations, embodiments of the computing device 610 employ designated circuits that may operate alone, or in conjunction with the controller 620, to provide predetermined contributions to various strategies, object characterizations, and aircraft taxiing automation. For instance, the computing device 610 may have a sensor circuit 640 that verifies the operational state of the assorted connected sensors. A fusion circuit 650 may combine the information of separate sensors into a single field of view that combines separately detected objects while removing redundantly detected objects and surfaces.

The computing device 610 may further employ an algorithm circuit 660 that executes sensor stream processing and evaluation to subsequently execute the routines and processes shown in FIGS. 3 and 5. An automation circuit 670 may proactively generate a taxiing strategy and/or automation strategy and react to changing taxiing conditions over time with automation instructions and/or automation tasks executed automatically or by manual aircraft operators. Through the proactive generation of the assorted strategies based on known, and detected, information, such as object characteristics, weather, aircraft sites, and possible taxiing routes, the computing device 610 may efficiently carry out, or instruct, taxiing activity with increased efficiency, accuracy, and safety.

While not required or limiting, a taxiing strategy may incorporate a variety of different policies, input data, and sensed information to prescribe one or more aircraft routes, speeds, and orientations that may be executed manually by human operators or automatically through the computer-directed execution of aircraft taxiing tasks. The proactive generation of a taxiing strategy that accounts for existing policies and site information may allow for efficient processing of sensor information and identification of situations where objects dictate changes in a prescribed aircraft taxiing route between a runway and a designated parking area.

Similarly efficient, the computing device 610 may proactively generate a fusion strategy that prescribes manners of accurately combining data streams from different sensors into a unitary image that represents the objects, surfaces, humans, and other obstacles present in an aircraft's field of view. The fusion strategy may prescribe any number, and type, of digital image analysis and alteration to eliminate redundant image aspects, detect false positive errors, and verify the size, position, and state of assorted objects. For instance, the computing device 610 may execute portions of the fusion strategy to remove shadows, highlight dynamic objects, and/or verify the position of a static object.

The accurate and efficient fusion of data streams from multiple different sensors, as carried out with the fusion strategy, may allow for efficient utilization of the taxiing strategy as well as the safe transport of an aircraft between a runway and designated parking area. To clarify, the existence of a taxiing strategy may prescribe aircraft route, and/or speed, variations that may be conducted in response to detected, or predicted, objects in the aircraft's field of view while the automation strategy prescribes how automation information is to be conveyed and/or carried out during taxiing. Together, the automation strategy and taxiing strategy may quickly react to at least the dynamic aspects of an aircraft's field of view by altering an aircraft's route and/or speed via automatic execution of automation tasks or instructions for manual operators to conduct altered taxiing activity.

Through the utilization of the assorted aspects of the computing device 610, data streams from different sensors of an aircraft may be accurately fused into a unitary image that allows for the identification of objects, tracking of dynamic objects, and efficient execution of an automation strategy to automate portions of a taxiing operation as safely and efficiently as possible. In addition, the proactive generation of assorted strategies allows for the safe, and perceivably seamless, automation of some, or all, of a taxiing operation for the aircraft that accommodates both static and dynamic aspects of an aircraft's field of view over the course of taxiing from, or to, a runway.

Figure 7:
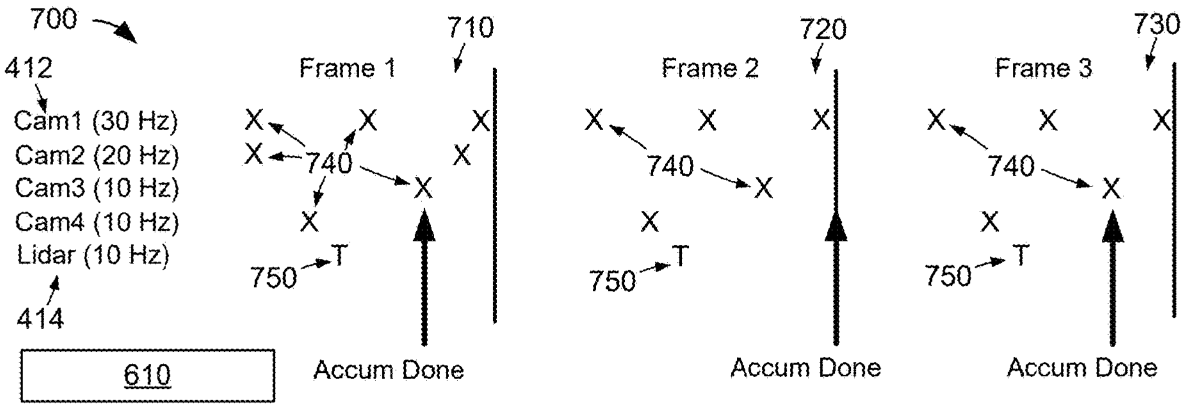
FIG. 7 illustrates operational aspects of a sensing system employed in a taxiing environment in accordance with assorted embodiments.

FIG. 7 illustrates aspects of a multi-sensor sensing system 700 operated in accordance with various embodiments. As shown, multiple optical sensors 412 are active at different frequencies (30 Hz/20 Hz/10 Hz) while a LiDAR sensor operates at a consistent frequency (10 Hz). It is contemplated that the respective sensors 412/414 operate at unique frequencies, or a single uniform frequency, to gather information from a common, or separate, fields of view. It is further contemplated that multiple LiDAR sensors 414 may be utilized with a common, or dissimilar, operating frequency.

With the presence of multiple separate sensors 412/414, particularly sensors operating at different frequencies, detecting and tracking objects over time may be challenging. For example, accumulating sensor information asynchronously may provide ample data to identify objects, but tracking objects over time may be difficult due to the aggregation of sensor information at different operating frequencies. Hence, embodiments of a computing device 202/610 create sensing frames that add a timing aspect to the detection of objects, surfaces, and other elements over time.

In predetermined situations, such as reaching an operational trigger, the computing device 202/610 may loop the operation of the assorted sensors 412/414 to form frames. An operational trigger is not limited to a particular time, place, or situation, but may involve the detection of a predetermined number, or type, of objects, detection of a predetermined aircraft activity, or detection of predetermined sensor condition, such as in response to faults, errors, or heightened sensing resolution. The looping of sensor 412/414 accumulation into frames ensures that information from each sensor 412/414 is present, which provides a more accurate understanding of an aircraft's field of view that allows for more precise object tracking over time compared to asynchronous accumulation of sensor information.

The looping accumulation of sensor data into frames, in accordance with a fusion strategy, may result in frames with different durations. That is, the triggered activation of looping sensor 412/414 aggregation may result in frames that last different amounts of time. The duration of a frame, in some embodiments, may correspond to registering data from each connected sensor 412/414. Accordingly, a frame may last as long as it takes for each connected sensor 412/414 to provide sensing information.

As illustrated in FIG. 7, optical sensor returns 740 (X) and LiDAR returns 750 (T) are collected by the computing device 610 until each connected sensor 412/414 provides a reading. Frame 710 conveys how numerous optical returns 740 may be recorded before a final sensor return prompts a new frame. It is contemplated that a frame may last any amount of time waiting for readings from each sensor 412/4114. However, the computing device 610 may prescribe a finite duration to loop sensor information before determining a sensor error, fault, or inactivity. Frame 720 conveys such a situation where sensor information is looped and aggregated until a prescribed deadline that prompts a new frame.

In the event the computing device 610 determines that a sensor 412/414 is inactive, faulty, or error-prone, the sensor 412/414 may be ignored for frame purposes. As conveyed by frame 730, the lack of sensed information from a sensor does not delay the ending of the frame once each valid sensor 412/414 returns sensed information. The ability to selectively ignore selected sensors 412/414 allows the computing device 610 to accommodate stale, or faulty, sensors 412/414 until a corrective event occurs, such as reactivation or correction of sensor 412/414 function. Through the asynchronous, and/or looped frame, accumulation of sensor information conducted in accordance a predetermined fusion strategy, the computing device 610 may detect, and track, objects with consistent efficiency and accuracy.

Figure 8:
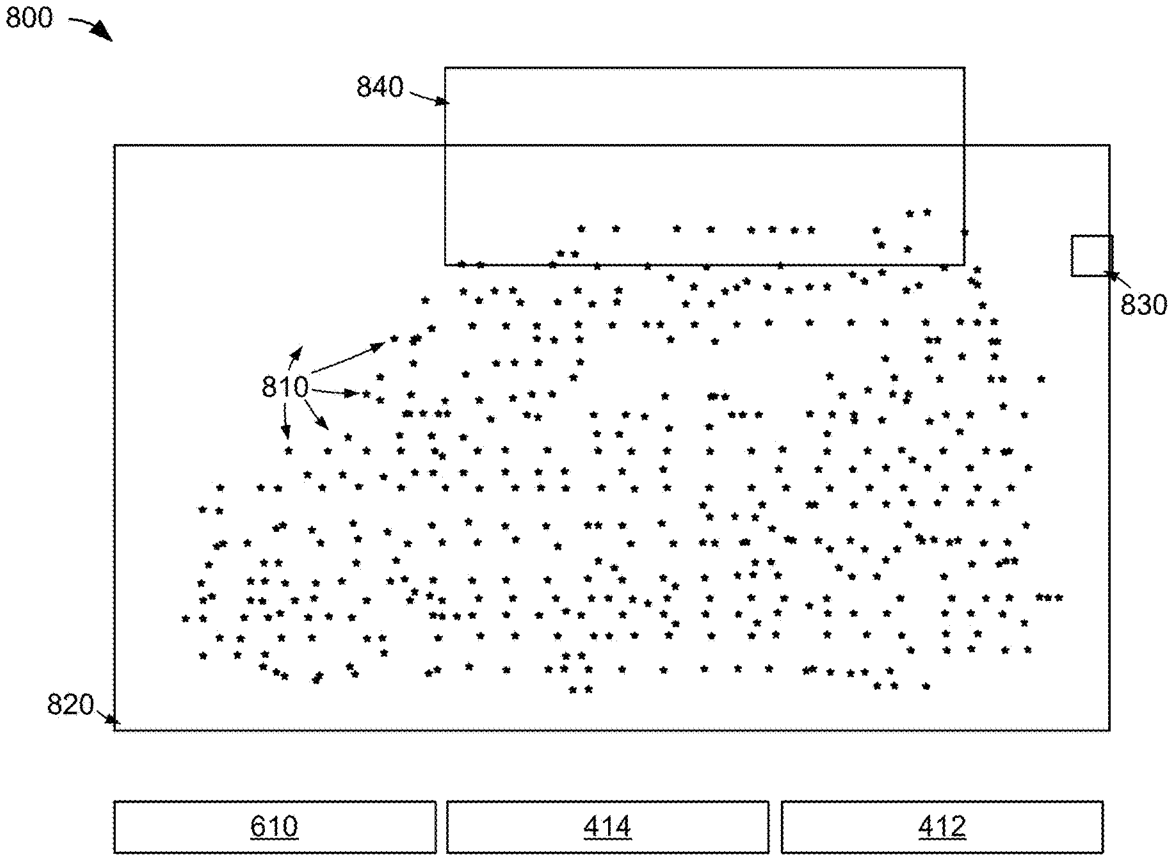
FIG. 8 illustrates operational aspects of a sensing system operated in accordance with various embodiments of this disclosure.

FIG. 8 illustrates a visual representation of aspects of a sensing environment 800 in which assorted embodiments of a sensing system are carried out. The operation of one or more LiDAR sensors in conjunction with one or more cameras result in LiDAR returns 810 in an overall field of view with independent fields of view of the respective cameras, as illustrated by boxes 820, 830, and 840. It is noted that object detection may be straightforward when a single optical sensor 412 is employed. However, the use of multiple separate camera sensors 412 may provide information that degrades object detection efficiency and/or accuracy, particularly when optical sensor information is combined with LiDAR sensor 414 information to detect, and track, objects.

To clarify the content of FIG. 8, an overall field of view for an aircraft employing multiple different sensors 412/414 may concurrently have an unstructured point cloud of LiDAR returns 810 positioned throughout the overall field of view. It is noted that the unstructured point cloud returns 810 may be present in one or more optical fields of view 820/830/840, which may make detecting, identifying, and tracking objects difficult. For instance, point returns 810 located in multiple camera fields of view 820/830/840 may provide complicated processing to determine if a single object, or multiple separate objects, are present.

In accordance with various embodiments, the presence of different optical fields of view 820/830/840 with an unstructured point cloud allows for the calculation of bid values for the respective LiDAR returns 810. A bid value may be calculated by the system's computing device 610 with equation (1):

$$B_{ij} = \frac{\text{\# Lidar } Det\ Pnts \text{ in Camera Box}}{\text{\# Lidar } Det\ Pnts} + \frac{\min(\text{Camera Box Area, Lidar } Det \text{ Area})}{\max(\text{Camera Box Area, Lidar } Det \text{ Area})}, \tag{1}$$

where i is the LiDAR detections and j is camera detections. The calculation of bid values allows for the statistical auction of the assorted camera and LiDAR detections. Unassigned LiDAR detections (i) are iteratively placed for auction while a bid value from each camera sensor (j) is computed according to equation (2):

$$C_j = B_{ij} - P_i \tag{2}$$

The computation of an auction price, in relation to the calculated bid values, allows for the intelligent assignment of detections to particular sensors of a multi-sensor sensing system. An auction price may be calculated according to equation (3):

$$P_i = P_i + \text{Highest }(C_j) - \text{2nd\_Highest }(C_j) + \epsilon \tag{3}$$

Figures 9, 10:
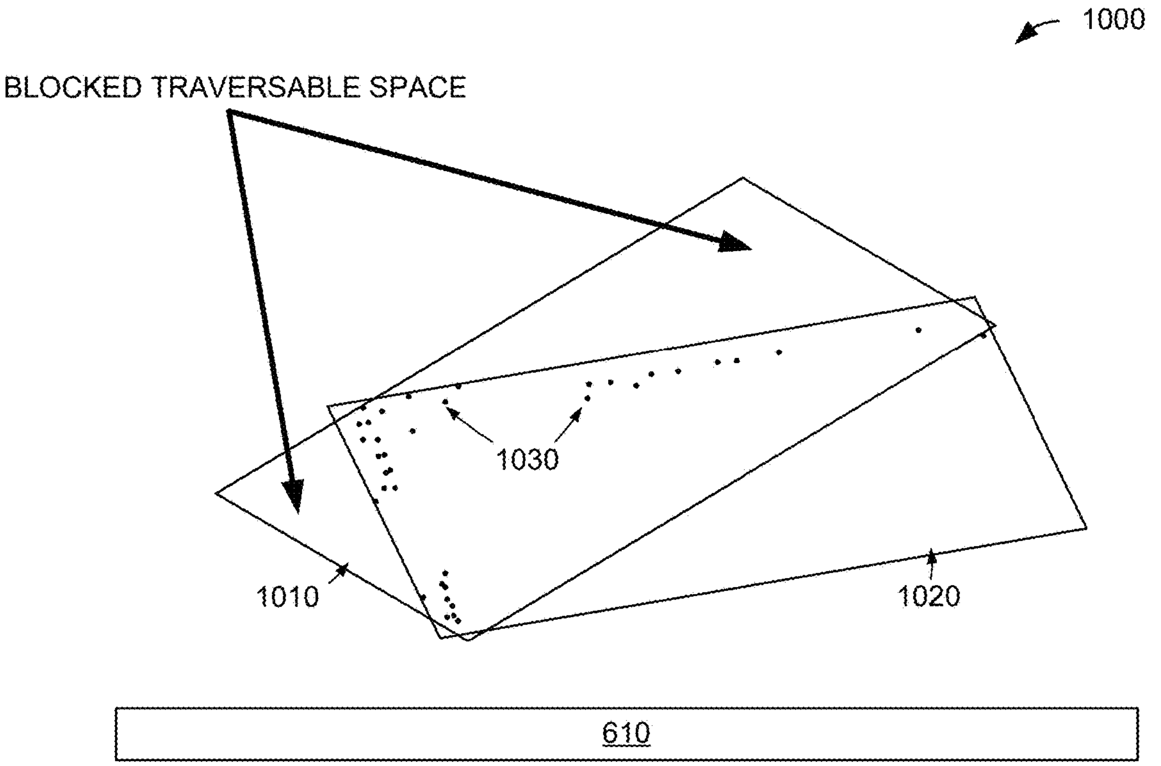
FIG. 9 illustrates operational portions of a sensing system conducted in accordance with embodiments of this disclosure.
FIG. 10 illustrates aspects of a taxiing environment in which a sensing system operates in accordance with various embodiments of the present disclosure.

With bid values for the respective camera detections and LiDAR detections along with the auction prices, a fusion auction may be conducted by the computing device 610. FIG. 9 conveys an example auction 900 that may be conducted by a computing device 610 of a sensing system in accordance with various embodiments. As shown, the auction 900 computes assorted bid values for the LiDAR sensors 414 of an aircraft that are subsequently employed by the computing device 610 to intelligently assign LiDAR sensors to particular camera sensors.

More specifically, bid values for the respective system camera sensors, as shown in columns 910 and 920, are utilized to compute an auction price, as shown in column 930, that dictates which LiDAR sensor is operationally compatible with which camera sensor, as shown in column 940. The computation of bid values, auction prices, and sensor assignments may cyclically occur over time, as conveyed by the assorted rounds of the auction 900. As such, the computing device 610 may provide optimized correlation of different system sensors to provide efficient and accurate detection and tracking of objects. In some situations, the computing device 610 may determine that no correlation of sensors is efficient and/or accurate, as illustrated in round 5 of the auction 900.

Although mathematical calculations may allow for intelligent correlation of LIDAR sensor readings with a selected camera sensor, pure algorithmic calculation of an areal extent of LiDAR sensor readings, which may be characterized as a bounding box, may not provide optimal operational settings. FIG. 10 illustrates aspects of a sensing environment 1000 in which a sensing system may operate to fuse the readings from multiple different sensors to provide efficient and accurate detection and tracking of objects in an aircraft's field of view.

The translation of a three dimensional space, with objects existing therein, to a two dimensional space may present operational challenges. For instance, purely algorithmic translation of three dimensional space to a two dimensional space may produce the bounding box 1010 while the practically optimal bounding box for LiDAR detection is box 1020. With the deficiency in purely algorithmic determination of a bounding box, the computing device 610 may generate the optimal bounding box 1020 in accordance with a predetermined fusion strategy.

While not required or limiting, the computing device 610 may determine "short" and "long" sides of a bounding box 1020 based on the projection of points onto a two dimensional plane. Next, the "short" and "long" sides are divided into N bins by the computing device 610 to allow for the assignment of object points. For each bin located on a "short" side, the computing device 610 chooses the "closest to" point and the "furthest from" points from the "opposite" projection to find evaluation points for two potential bounding box sides. After repeating the process for the "long" side, four sides of a two dimensional bounding box may be provisionally set by the computing device 610.

The computing device 610 may continue to compute pairwise direction vectors between evaluation points for all four provisional bounding box sides, which allows for the selection of a "best fit" direction vector. Subsequently, the computing device 610 may compute a circumscribing rectangle for each of the four potential bounding box sides in order to select the minimum area two dimensional bounding box 1020 to capture the LIDAR returns 1030.

In accordance with a fusion strategy, the computing device 610 may classify LIDAR sensor detections via ensemble voting that uses a weighted hard voting scheme, as provided in equation (4):

$$V_{wj} = \begin{cases} 1.5, & C_j \geq 0.9 \\ 1.0, & 0.65, \leq C_j < 0.9 \\ 0.5, & C_j < 0.65 \end{cases} \tag{4}$$

In the event of a tie from the weighted hard voting scheme, the computing device 610 may utilize soft voting to classify detections. Through the execution of aspects of the fusion strategy, the computing device 610 may provide a confidence metric for a detection classification, which may be the mean confidence of the winning class from equation (4).

Figure 11:
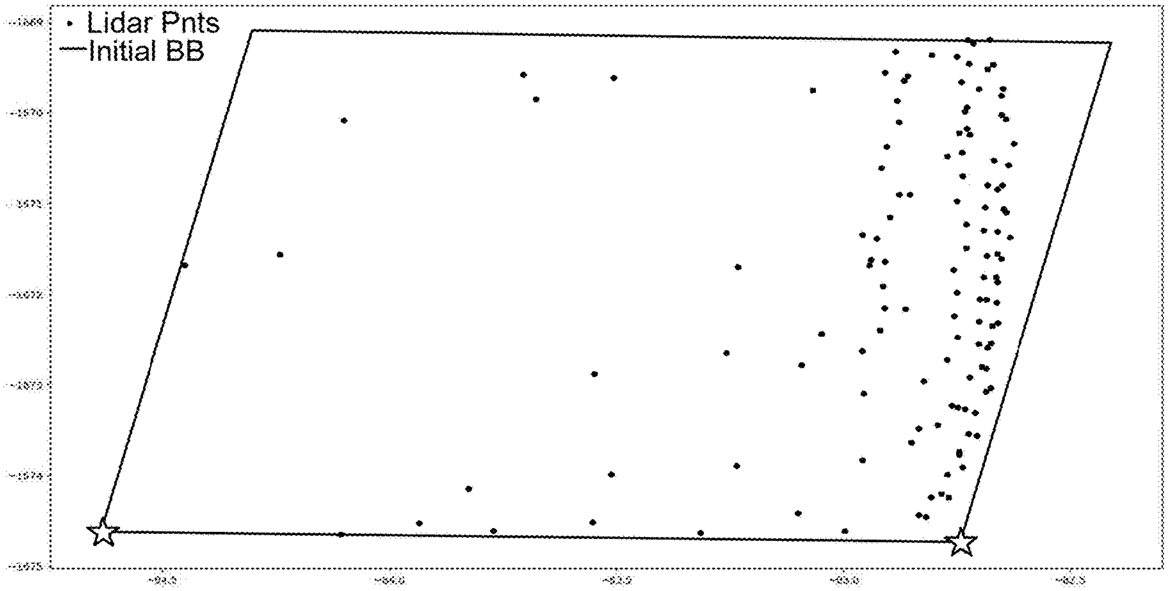
FIG. 11 illustrates portions of a taxiing environment in which a sensing system conducts embodiments of the present disclosure in a sensing environment.
Figure 12:
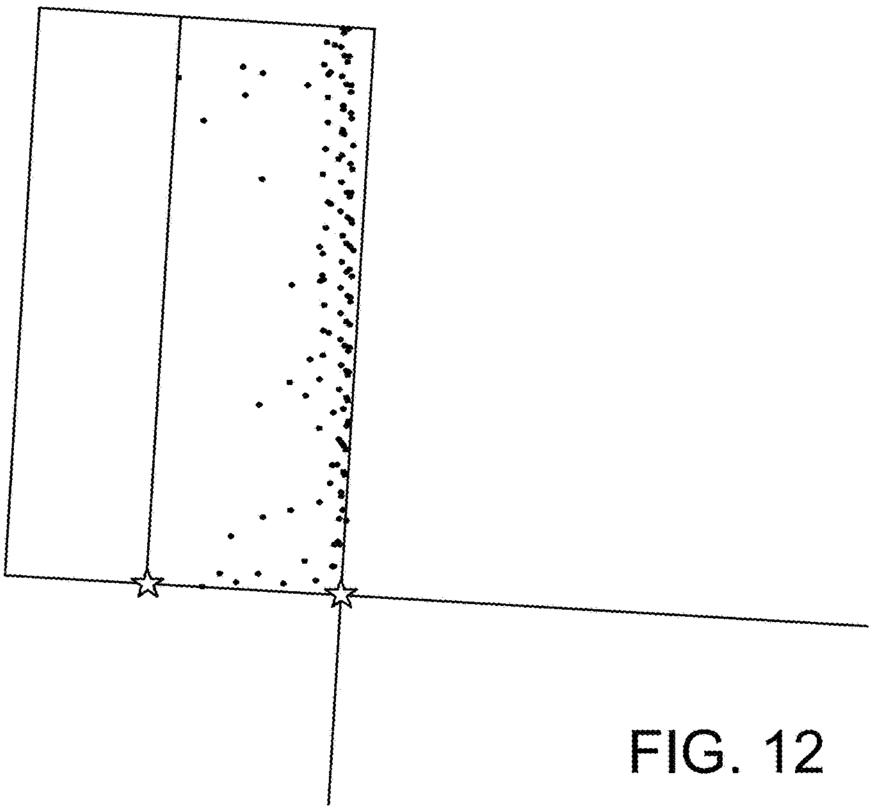
FIG. 12 illustrates aspects of a taxiing environment in which a sensing system operates in accordance with some embodiments.

The intelligent correlation of sensors and generation of two dimensional bounding boxes by the computing device 610 may allow for practical application in real space. FIGS. 11 and 12 respectively illustrate portions of a sensing environment 1100 and 1200 in which a sensing system may execute aspects of a fusion strategy to project LiDAR detections onto a two dimensional plane in real space, such as ENU coordinates of an airport. With the real space coordinates and the global position of an aircraft, the computing device 610 may approximate the taxi surface.

The projection of LiDAR detections onto a two dimensional plane with real space coordinates allows an bounding box to be created. It is noted that a predetermined bounding box may be initially utilized and customized to the real space by the computing device 610. For instance, an initial bounding box may be evaluated by the computing device 610 in real space to determine the two bounding box corners closest to the LiDAR sensor. From these two corners, the computing device 610 may determine which is closer to the assigned camera sensor, which corresponds with an assigned projection reference corner.

The computing device 610 then re-projects the four camera bounding box corners onto the two planes adjoining the projection reference corner to compute intercept points. A bounding box center may be computed after the computing device 610 extends the oriented bounding box side lengths, as needed to encompass the LiDAR detections, as conveyed in FIG. 12. Accordingly, the LiDAR bounding box will be projected in real space and allow for accurate and efficient identification of the real location of objects, which may correspond with more accurate tracking of dynamic object direction and speed over time as well as determinations about whether dynamic objects necessitate alterations to a taxiing route for an aircraft.

Figure 13:
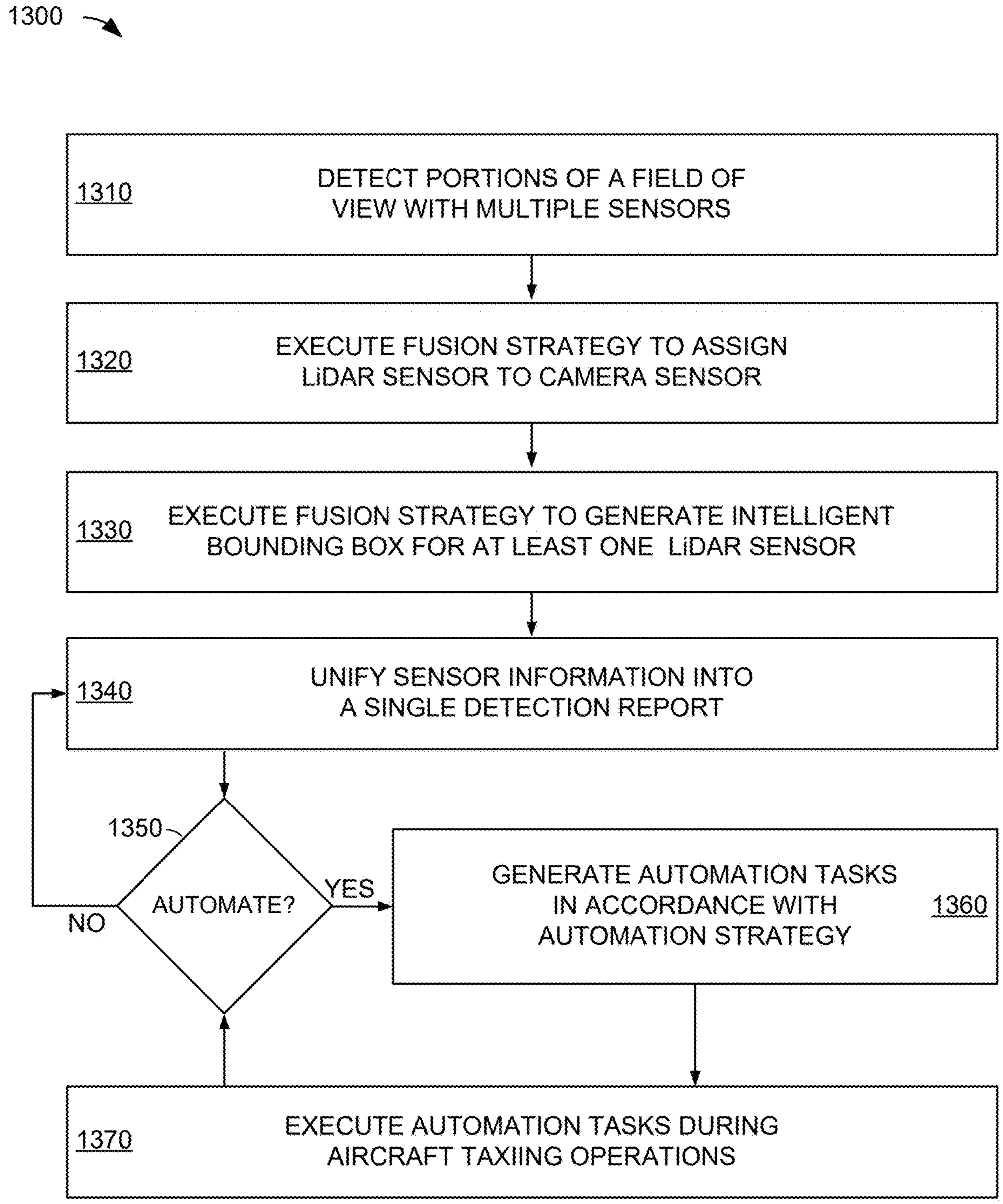
FIG. 13 illustrates a flowchart of operations carried out in various embodiments of a sensing system.

FIG. 13 is a flowchart of a fusion routine 1300 that may be carried out by a computing device 610 in a sensing environment in accordance with various embodiments. It is noted that a sensing environment may be an airport with an aircraft outfitted with a multi-sensor sensing system controlled by a connected computing device. With the assorted sensors of the sensing system located at assorted locations along the wings/fuselage of the aircraft, step 1310 may begin detecting aspects of the aircraft's field of vision by activating the assorted sensors concurrently, or sequentially.

The activation of the assorted sensors may, in some embodiments, correspond with looped generation of different frames. In other embodiments, the activation of sensors in step 1310 may correspond with asynchronous accumulation of sensor information. The accumulation of sensor information allows a computing device to execute portions of a fusion strategy in step 1320 to assign at least one LiDAR sensor to an optical camera sensor. The execution of the fusion strategy in step 1320 may further involve computing bid values and auction prices for various returns and detections of an unstructured LiDAR point cloud.

The intelligent correlation of a particular LiDAR sensor with a particular camera sensor may provide accurate and efficient understanding of the presence of objects in an aircraft's field of view. Step 1330 proceeds to execute the fusion strategy to generate a bounding box that intelligently translates three dimensionally present objects into a two dimensional plane that corresponds with coordinates of a real space, such as an airport. Through the intelligent association of sensors and translation into a two dimensional real space, a computing device may proceed, in step 1340, to complete the fusion strategy to provide a unified detection report that considers the different sensors of the sensing system.

With a single, unified sensor report, the computing device may understand a variety of information about the conditions proximal to an aircraft. For instance, the computing device may accurately detect, identify, and classify various objects, surfaces, and obstacles, which may include determining object speed and direction of movement. Such understanding about the surroundings for an aircraft allows the computing device to determine, in decision 1350, if portions of a taxiing operation may be automated. If so, step 1360 proceeds to generate one or more automation tasks that are submitted to manual operators and/or automatically executed without manual involvement, in accordance with an automation strategy.

With automation tasks generated, or altered, in response to the detection report from step 1340, step 1370 may execute the tasks as part of a taxiing operation. As a non-limiting example, step 1370 may involve the participation of a manual operator, supervision of a manual operator, or exclusion of a manual operator. That is, the automation tasks may take the form of text, or visual, prompts to an aircraft operator or automatically conduct physical actions, such as change of speed or direction of travel.

In the event the unified sensor report is not conducive to automation of aspects of a taxiing operation, routine 1300 returns to step 1340 until changes in the aircraft's situation are detected. For instance, a sensing system may detect a change in a static object to a dynamic object that prompts additional detection in steps 1310-1340 and/or automation of taxiing operations in steps 1360 and 1370.

Through the intelligent fusion of multiple separate sensors, a sensing system may provide optimal automation of assorted taxiing activities to increase efficiency and safety of aircraft movement. The intelligent accumulation of sensor data, generation of bounding boxes, auctioning of sensor correlations, and translation of sensor data to two dimensional projections allows the sensing system to accurately, and seamlessly, integrate automation into a taxiing operation.

Additional embodiments include any one of the embodiments described above, where one or more of its components, functionalities or structures is interchanged with, replaced by or augmented by one or more of the components, functionalities or structures of a different embodiment described above. It should be understood that various changes and modifications to the embodiments described herein will be apparent to those skilled in the art. Such changes and modifications can be made without departing from the spirit and scope of the present disclosure and without diminishing its intended advantages. It is therefore intended that such changes and modifications be covered by the appended claims.

Although several embodiments of the disclosure have been disclosed in the foregoing specification, it is understood by those skilled in the art that many modifications and other embodiments of the disclosure will come to mind to which the disclosure pertains, having the benefit of the teaching presented in the foregoing description and associated drawings. It is thus understood that the disclosure is not limited to the specific embodiments disclosed herein above, and that many modifications and other embodiments are intended to be included within the scope of the appended claims. Moreover, although specific terms are employed herein, as well as in the claims which follow, they are used only in a generic and descriptive sense, and not for the purposes of limiting the present disclosure, nor the claims which follow.

What is claimed is:

1. A sensing system comprising:

a vehicle;

a plurality of first sensors, wherein each of the plurality of first sensors comprises a first field of view;

a plurality of second sensors, wherein each of the plurality of second sensors comprises a second field of view; and a computing device connected to each of the plurality of first sensors and each of the plurality of second sensors, wherein the plurality of first sensors and the plurality of second sensors are mounted on the vehicle, wherein the computing device fuses data from the plurality of first sensors and the plurality of second sensors into a unified detection report, wherein the computing device automates portions of a taxiing operation in response to information in the unified detection report, and wherein the computing device assigns a first sensor from among the plurality of first sensors to a second sensor from among the plurality of second sensors after computing an auction price for a detection of the first sensor such that an object detected within a field of view of the first sensor is located within a field of view of the second sensor.

2. The sensing system of claim 1, wherein the plurality of first sensors are LiDAR sensors.

3. The sensing system of claim 2, wherein the plurality of second sensors are optic sensors.

4. The sensing system of claim 1, further comprising a third sensor connected to the computing device and included in the unified detection report.

5. The sensing system of claim 1, wherein the vehicle is an aircraft.

6. The sensing system of claim 1, wherein the first sensor is an optic sensor with a first lens and the second sensor is an optic sensor with a second lens, the first lens differing from the second lens.

7. The sensing system of claim 1, wherein the computing device automates portions of the taxiing operation by sending instructions to a human operator of the vehicle.

8. The sensing system of claim 1, further comprising a third sensor, wherein the second sensor is a first optic sensor having a first optical configuration and the third sensor is a second optic sensor having a second optical configuration.

9. A method comprising:

detecting, with a computing device, a first field of view with a first sensor and a second field of view with a second sensor, each sensor mounted on a vehicle;

fusing, with the computing device, the first field of view with the second field of view to form a unified detection report; and automating, with the computing device, portions of a taxiing operation in response to information in the unified detection report, wherein the computing device assigns the first sensor to the second sensor after computing an auction price for a detection of the first sensor such that an object detected within a first field of view of the first sensor is located within a second field of view of the second sensor.

10. The method of claim 9, wherein the computing device conducts signal processing on the first field of view and the second field of view independently prior to a fusion engine of the computing device fusing the respective fields of view.

11. The method of claim 9, wherein the computing device classifies at least one object with the information of the unified detection report.

12. The method of claim 11, wherein the at least one object is classified as a dynamic object by the computing device.

13. The method of claim 11, wherein the at least one object is tracked over time by the computing device during the automation of the portions of the taxiing operation.

14. A method comprising:

detecting, with a computing device, a first field of view with a first sensor and a second field of view with a second sensor, each sensor mounted on an aircraft;

fusing, with the computing device, the first field of view with the second field of view to form a unified detection report;

generating, with the computing device, an automation task in response to information in the unified detection report;

determining, with the computing device, a destination for the automation task; and automating, with the computing device, portions of a taxiing operation by executing the automation task via the destination, wherein the computing device assigns the first sensor to the second sensor after computing an auction price for a detection of the first sensor such that an object detected within a field of view of the first sensor is located within a field of view of the second sensor.

15. The method of claim 14, wherein the automation task is a deviation in a predetermined taxiing route between a runway and a designated aircraft parking region.

16. The method of claim 14, wherein the automation task is a deviation in a predetermined taxiing speed.

17. The method of claim 14, wherein the destination is a manual operator of the aircraft.

18. The method of claim 14, wherein the computing device communicates the automation task to the manual operator via a visual message.

19. The method of claim 14, wherein the destination is an automation circuit of the computing device.

20. The method of claim 14, wherein the automation of the portions of the taxiing operation is conducted without involvement of a manual operator of the aircraft.

* * * * *